Patented Nov. 27, 1951

2,576,731

UNITED STATES PATENT OFFICE 2,576,731

METHOD OF PREPARING A FUNGICIDAL PREPARATION UTILIZING MAGNESIUM HYDROXIDE

Alfred M. Thomsen, San Francisco, Calif.

No Drawing. Application November 19, 1948, Serial No. 61,113

2 Claims. (Cl. 167—16)

My process may be defined as the ways and means whereby certain valuable properties of magnesium hydroxide are used in the insecticide and fungicide industries. In view of its chemical composition, which renders it absolutely harmless to vegetation, it forms an efficient neutralizer for any objectionable acidic material which would otherwise harm the plant. Mechanically, as its nature approximates that of a colloid, it forms a very satisfactory substance as a dispersing agent and as an adhesive to plant tissue. After once being dried upon the plant, it forms an extremely adherent deposit which will stand a great many wettings before being washed off and as it absorbs carbonic acid extremely slowly, its alkalizing properties are not speedily vitiated.

Lime is today the universal alkalizing and spreading agent used but it has many faults as it is neither very adhesive nor very safe to the plant and also it is too alkaline. Furthermore, it absorbs carbon dioxide from the air with such speed that it soon becomes the harmless carbonate with no adhesion worthy of the name.

By itself alone, of course, magnesium hydroxide has no insecticidal or germicidal power but it acquires these when it is commingled with various forms of copper, zinc, arsenic, lead, etc. Another supplementary use is in the manufacture of oil sprays. In this case, to make the oil safe for the plant, it is necessary to reduce the unsaturated compounds to a very low figure but unfortunately such refining greatly hinders the very purpose for which it is applied to the plant; namely, the control of parasites. I find that magnesium hydroxide, in water suspension, emulsifies freely with any type of mineral oil now used to make oil sprays and that the presence of the magnesia renders the unsaturated compound far less toxic to the plant, thus permitting far higher utilization of the unsaturated compounds than is now feasible.

I will now give some illustrations of the way in which a formula based upon magnesium hydroxide can be adapted to the purpose herein described: To a suspension of say 8% magnesium hydroxide water, I add a sufficient amount of arsenic acid to combine with one-fourth of this material to form the normal arsenate, which calls for 4% of arsenic acid calculated as arsenic pentoxide. The result of this admixture is an extremely basic form of magnesium arsenate which is virtually insoluble and toxic to relatively few plants though such distinction comes within the scope of the horticulturist rather than the maker of an insect spray. Manifestly, if it were desired to make the spray even more basic, the arsenic could be suitably decreased. Even arsenite, which is normally frowned upon, can be substituted for the arsenate by simply using arsenic trioxide in place of the arsenic acid previously specified.

Arsenates of lime and lead are the time honored standards in the insecticide field and these can be simply commingled in any proportion found desirable with a suspension of magnesium hydroxide and directly applied to the plant.

In a similar manner to the way which I have used arsenic any of the metals previously mentioned may be used. It is preferable to add them directly in sulphate form to a suspension of magnesium hydroxide, thus forming a precipitate of the hydroxide of the metal and a solution of magnesium sulphate. This latter could be removed by washing but it is generally preferable to simply add lime and reprecipitate it as magnesium hydroxide, the sulphate then combining with the lime to form the innocuous calcium sulphate. In the event that a salt of lead were used, the sulphate would, of course, not be acceptable and to remove objectionable soluble salts the washing technique would become mandatory. As lead combinations the nitrate or the acetate would generally be preferred.

I will now give an illustration of a formula for using copper. As before, I start with an approximate 8% suspension of magnesium hydroxide and commingle same with sufficient copper sulphate to combine with one-fourth of the magnesium hydroxide which would call for approximately 9% of crystallized bluestone. After agitation, until the copper is entirely precipitated by the magnesia, there is then added 2½% of the burnt lime, or its equivalent in hydrated form, to precipitate as hydroxide the Epsom salts produced in the former reaction. By substituting zinc for copper or for a portion of the copper any blend can manifestly be made.

The use of magnesia in oil sprays will have to be considered purely on an empirical basis. A stable emulsion is readily formed and can be diluted to any extent, without separation of the oil ingredients. In all these cases, I have considered the magnesium hydroxide to be used as an 8% suspension because this is convenient but it is very simple by the use of a suction filter to dehydrate this material to such an extent that the total solids will approximate 40%. This practice in no way interferes with the colloid character of the material which requires merely diluting to make it useful while it much facilitates the handling and the shipping of the commodity. Manifestly, this same system of water removal can be used on any of the products which I have described herein.

Having thus fully described my process, I claim:

1. The method of preparing a fungicidal preparation which comprises; commingling a water suspension of magnesium hydroxide with a sufficient amount of a soluble metallic sulphate selected from the group consisting of copper and zinc to convert less than one-half of the resident magnesium into the soluble sulphate; adding a sufficient amount of calcium hydroxide to precipitate the soluble magnesium salt produced in the former reaction, the resident sulphate thus being converted into calcium sulphate.

2. The method of preparing a fungicidal preparation which comprises; commingling a water suspension of magnesium hydroxide with a water solution of the sulphates of zinc and copper in such proportion as to convert less than one-half of the resident magnesium into the corresponding amount of soluble sulphate; adding a sufficient amount of calcium hydroxide to precipitate the soluble magnesium salt produced in the former reaction, the resident sulphate thus being present as calcium sulphate.

ALFRED M. THOMSEN.

REFERENCES CITED

The following references are of record in the file of this patent:

UNITED STATES PATENTS

| Number | Name | Date |
|---|---|---|
| 1,417,232 | Dow | May 23, 1922 |
| 1,420,978 | Dow | June 27, 1922 |
| 1,598,982 | Newhall | Sept. 7, 1926 |
| 2,109,683 | Seibert | Mar. 1, 1938 |
| 2,138,733 | D'Amico | Nov. 29, 1938 |